Patented Apr. 5, 1949

UNITED STATES PATENT OFFICE 2,466,663

FUNGICIDE CONTAINING CAPRYLIC ACID AND ITS SALT

Walter R. Russ, Little Falls, N. J., and Charles Hoffman, Scarsdale, Thomas R. Schweitzer, Bellaire, and Gaston Dalby, New York, N. Y., assignors to Ward Baking Company, New York, N. Y., a corporation of New York No Drawing. Application October 20, 1944, Serial No. 559,660

8 Claims. (Cl. 167—58)

Our invention relates to fungistatic or fungicidal agents for combating mycotic infection on growing or living organisms.

The use of lower fatty acids to prevent growth of molds and fungi on foods and other inert nutrient mediums has been known. However, the conditions of growth in such materials are quite different from those present in the growth of mycotic infections in, or on, living organisms. In inert nutrient mediums the conditions are static or constant, the factors of growth, such as the pH of the medium, may be kept constant and factors that might interfere with the effectiveness of the fungistat or fungicide are generally absent or may be avoided. An agent that is effective at a certain concentration on an inert nutrient medium may not be effective on, or effective at, the same concentration or conditions, if at all, on a living organism where it may be rapidly absorbed or oxidized or volatilized or otherwise rendered ineffective or inactive without necessarily leaving any clue as to its failure.

Our present invention provides agents for combating mycotic infections or growths, which agents are compatible with and do not disturb or impair the living organisms and which may, therefore, be present in relatively high concentration, which may be used under a wide variety of conditions inimical to the function of the agent and which are resistant to destruction or impairment of their activities and are effective against a wide variety of pathogenic fungi.

In our invention we provide a medium that is compatible with the living organism as, for example, with the skin, membrane or blood stream of humans or animals generally and which contains caprylic acid and its salt or salts either in solution or suspension or in a suitable mixture in the medium. The acid and its salt may be present in such proportion as to provide a pH within the range of effectiveness of the acid. The optimum range of this acid is a wide one from about 4.5 to about 10.5

The mixture of caprylic acid and salt may be obtained either by mixing them in proper proportions or by partially neutralizing the acid with a suitable base, either inorganic or organic, or by adding an acid to a solution of the salt until the preferred pH is attained.

The acid and its salt are not readily volatile having a boiling point under atmospheric pressure of 200° C. and up and having correspondingly low vapor tensions at room or body temperatures. They may, therefore, be held on the skin for a longer period of time without disappearing through volatilization. They are also not absorbed rapidly by the living organism as, for example, when injected into the blood stream as are the lower fatty acids which are under similar circumstances absorbed or oxidized as a food and, therefore, have a much shorter period of usefulness, and may be rendered quite ineffective before they have an opportunity to attack the fungi.

The acid-salt mixture may be present in a medium suitable for the particular condition under which it is to be used. For example if it is to be used for a subcutaneous or intravenous injection it may be used in an aqueous solution having the same pH as the blood. If it is to be used to attack a mycotic infection on the skin or membrane it may be used in aqueous solution with or without a penetrating agent, or in ointment in which it is dissolved or suspended, or in a dressing or a gel which leaves a retentive film on evaporation. For insufflation or as a preventive against infection or re-infection, the acid-salt mixture may be used as a powder, that is, admixed with a diluent powder such as talc, kaolin, bentonite, starch, etc.

For example the caprylic acid, an 8 carbon acid, may be used in aqueous solution by dissolving to a 10% solution and then adding an alkali hydroxide or carbonate such as sodium, potassium or ammonium hydroxide or carbonate, or an organic base such as triethanolamine, a quaternary ammonium compound, sulphonium hydroxide, until the preferred pH is attained, generally between 4.5 and 10.5. The pH is preferably adjusted to the living organism, to be innocuous or non-irritating to the organism.

Or a 10% solution of a caprylate as, for example, sodium caprylate may be adjusted to the proper pH by means of any soluble acid, such as hydrochloric, caprylic, acetic, etc. This solution may also contain a wetting agent as, for example, one-tenth of one per cent of "Aerosol" and may contain 10% of n-propyl alcohol, ethyl or other alcohol. Such a solution may be used as a 10% solution or a concentration even lower as, for example, a one per cent solution. While solutions as low as one per cent are effective their action is much slower and generally there is no advantage in using a solution much below 10%. More concentrated solutions may be employed but there is no substantial advantage in increasing the percentage above 10%, which concentration is effective against most mycotic infections.

It will be understood that the active agent is the caprylate radical or ion and, therefore, the choice of base is wide, depending solely upon avoiding any base that would be poisonous or injurious to the living organism. It may be advantageous to use zinc as a base or as an addition, as zinc reinforces the fungicidal or fungistatic action of the acid radical or ion.

If the caprylate is to be used in powder for dusting or insufflation a salt of the caprylate, such as a sodium salt, or calcium salt, or a mixture of salts as, for example, sodium caprylate and zinc caprylate, may be admixed in finely powdered form with talc, kaolin, bentonite or starch in a proportion of 10% of caprylate. A part of the diluent talc or other product may be replaced by a zinc compound such as zinc stearate or zinc oleate.

The caprylate may be incorporated in an ointment of any suitable base. The following is an example of a water dispersible ointment.

No. 1

| | Per cent |
|---|---|
| Caprylic acid | 10 |
| Triethanolamine | 8.75 |
| Propylene glycol | 16.25 |
| Methyl cellulose ester (Methocel) | 2 |
| Carbowax 1500 | 50 |
| Zinc caprylate | 13 |

The carbowax 1500 is a polymerized polyethylene glycol of a molecular weight of about 1500.

A fat and water emulsion ointment may be made of the following constituents.

No. 2

| | Per cent |
|---|---|
| Stearic acid | 2 |
| Hydrogenated, sulphonated fat | 5 |
| Triethanolamine stearate | 5 |
| Beeswax | 1 |
| Petrolatum | 50 |
| Sodium caprylate | 10 |
| Water | to 100 |

A gel type of medium may be formed of the following composition.

No. 3

| | Per cent |
|---|---|
| Caprylic acid | 10 |
| Triethanolamine | 8.75 |
| Water soluble cellulose ester | 10 |
| "Aerosol" (wetting agent) | 0.1 |
| n-Propyl alcohol | 10 |
| Water | to 100 |

Optionally, zinc stearate, zinc oleate, zinc sulphate, zinc chloride, may be added to the medium.

The liquid, ointment and powders of our invention have proved effective in concentrations of one per cent or more by weight against *Microsporum audouini*, *Microsporum lanosum*, against the Trichophyton group, against the Monilia group (albicans) and against the Epidermophyton groups as, for example, inguinale, interdigitalis, rubrum and also against Mycobacteris. It is also effective against certain protozoa such as *Trichomonas vaginalis*.

The treatment of surface infections may comprise the successive application of the liquid, ointment and powder to combat infection already present and to guard against re-infection. For combating internal infection a ten per cent solution of a pH between 5 and 8, and preferably at a pH of the blood, may be injected until the infection disappears.

It will be understood that the acids should be active, that is, not associated with other fatty acids such as dimers, etc. that would decrease their effectiveness.

Halogen substituted acids may also be employed. It will be understood that halogen substituted caprylic acid and its salts are included under the general term caprylic acid and its salts.

What we claim is:

1. A composition for inhibiting the growth of pathogenic micro-organisms on living tissues which contains a mixture of caprylic acid and a salt of caprylic acid and a diluent medium, said composition having a pH between 4.5 and 10.5, said mixture of caprylic acid and salt of caprylic acid comprising more than 1.0% of said composition.

2. The composition of claim 1 in which said mixture of caprylic acid and salt of caprylic acid comprises at least about 10% of said composition.

3. A composition as defined in claim 1 comprising propylene glycol.

4. A composition as defined in claim 1 comprising an alcohol having from 2 to 3 carbon atoms.

5. A composition as defined in claim 1 containing a zinc compound.

6. The composition of claim 1 in which said salt of caprylic acid is zinc caprylate.

7. The composition of claim 1 in which said diluent is an ointment comprising an aqueous solution of poly ethylene glycol of a molecular weight of at least 1500.

8. The composition of claim 1 in which said diluent is a finely divided solid, inert to said mixture of caprylic acid and salt of caprylic acid.

WALTER R. RUSS.
CHARLES HOFFMAN.
THOMAS R. SCHWEITZER.
GASTON DALBY.

REFERENCES CITED

The following references are of record in the file of this patent:

UNITED STATES PATENTS

| Number | Name | Date |
|---|---|---|
| 2,175,780 | Prehn | Oct. 10, 1939 |
| 2,190,714 | Hoffman | Feb. 20, 1940 |
| 2,217,905 | Hoffman et al. | Oct. 15, 1940 |
| 2,267,101 | Hueter | Dec. 23, 1941 |
| 2,290,710 | Rice | July 21, 1942 |
| 2,314,125 | Coca | Mar. 16, 1943 |

OTHER REFERENCES

Article by Hoffman et al. in Food Research, 4 (1939), pages 539 to 545.

Article by Peck et al., reprinted from Arch. Derm. & Syph., Jan. 1939 — original pages numbered 126–146, reprint pages numbered 1–21.